United States Patent [19]

Lampbell

[11] Patent Number: 4,978,303

[45] Date of Patent: Dec. 18, 1990

[54] PHYSICAL ACUITY TEST DEVICE

[75] Inventor: Al Lampbell, Santa Clara, Calif.

[73] Assignee: Savalife, A California General Partnership, Larkspur, Calif.

[21] Appl. No.: 307,294

[22] Filed: Feb. 6, 1989

[51] Int. Cl.[5] .............................................. G09B 19/00
[52] U.S. Cl. .................................... 434/258; 434/236; 434/247; 272/76; 273/138 R; 273/1 GE; 364/413.02; 340/573
[58] Field of Search ....................... 434/247, 258, 236; 272/76, 129, DIG. 5; 273/16 E, 1 E, 138 R, 138 A; 340/573, 576; 364/413.01, 413.02

[56] References Cited

U.S. PATENT DOCUMENTS

| 3,024,020 | 3/1962 | Alton . | |
| 3,755,776 | 8/1975 | Kotras . | |
| 3,886,540 | 5/1975 | Sussman . | |
| 3,918,176 | 11/1975 | Abernethy . | |
| 4,028,819 | 6/1977 | Walker . | |
| 4,093,870 | 6/1978 | Epstein . | |
| 4,438,932 | 3/1984 | Finkel | 273/1 E X |
| 4,464,121 | 8/1984 | Perelli | 434/258 X |
| 4,755,140 | 7/1988 | Rimland | 273/1 E X |
| 4,770,636 | 9/1988 | Buschke | 434/236 |
| 4,818,234 | 4/1989 | Redington et al. | 434/247 |

Primary Examiner—Richard J. Apley
Assistant Examiner—Joe H. Cheng
Attorney, Agent, or Firm—Irell & Manella

[57] ABSTRACT

An apparatus for generating non-personalized and personalized test scores. Characters are displayed on a display of a housing containing a microprocessor and means for driving the display. A keyboard is provided on the housing, whereby the user of the device may match a cursor on the display with each of the displayed characters, with the number of actions taken by the user, the time of response, and the number of correct and incorrect responses by the user being used to generate a score. The score may be used for comparison with later scores of the same user, who is identified by an individualized code stored in the microprocessor. The date and time of the most recent test for the given user may also be stored in the microprocessor. A test may be taken which is not to be compared with any other test results, in the non-personalized embodiment. Pass and fail displays are provided, to generate a pass or fail result depending upon the user's score compared with his earlier score or with a standardized score. The standardized score may take into account various factors, such as weight, age, sex, etc. The device may be used by itself, or may be interlocked with machinery to be operated by the user, so as to detect physical inability to properly operate such machinery.

7 Claims, 12 Drawing Sheets

PHYSICAL ACUITY TEST DEVICE

BACKGROUND OF THE INVENTION

1. Field of the Invention

This invention relates to a device for testing physical acuity. It provides a test built around alertness and coordination rather than memory and provides a rapid determination of the test subject's physical acuity or impairment by reason of intoxication.

2. Prior Art

There is an ever increasing awareness that many functions in today's complex world require minimum levels of physical acuity and cannot tolerate substantial levels of impairment through fatigue, intoxication, or stress. Well known settings relate to the operation of motor vehicles on the highway, to the operation of heavy equipment at the job site, and to the operation of machine tools and the like in a factory setting. In these and other situations, it would be desirable to have a simple and reliable test device which provides information related to the particular test subject's performance.

Heretofore, devices have been used to provide a physical/chemical reading of actual intoxicant levels. These devices, such as the "breath-a-lyzer", or the actual drawing of an individual's blood for chemical measurement, are time consuming and require constant recalibration.

A number of electronic devices have also been proposed in the art. U.S. Pat. No. 3,024,020, issued to Werner Alton et al. in 1962, provided a large-scale device where the test subject stepped on a plurality of treble switches to generate a signal to match a provided standard signal. U.S. Pat. No. 3,886,540, issued to E. Donald Sussman et al in 1975, disclosed an ignition interlock device in which the operator presses buttons in response to illumination of certain preselected lights. U.S. Pat. No. 3,755,776, issued to William A. Kotras in 1973, provides an ignition interlock device in which a number is displayed to a test subject and then removed. The test subject must input the number to start the car. U.S. Pat. No. 3,918,176, issued to Charles N. Abernethy, III et al. in 1975, provides an automobile safety interlock system based on the test subject's ability to properly move his attention between two displays. U.S. Pat. No. 4,028,819, issued to Norman K. Walker in 1977, provides a means for measuring the test subject's performance in a first test task while under variable levels of stress induced by the performance of a second task. U.S. Pat. No. 4,093,870, issued to Lawrence J. Epstein in 1978 provides an ignition interlock device in which a predetermined correct sequence of signals must be sent to the device within a predetermined period to achieve an unlock of the ignition or the like. U.S. Pat. No. 4,464,121, issued to Lane P. Perelli in 1984, provides a performance assessment device in which the test subject is provided with a series of tests with increasing difficulty. Response time is the parameter measured.

These prior devices differ from the present invention in that, in general, they compare the test taker to a universal standard. This can have the deficiency of unfairly penalizing certain individuals who are inherently less coordinated or have decreased memory skills, and also permitting other individuals through training or exceptional skills, to pass the test even when impaired.

It is a fundamental object of this invention to provide a physical acuity test device which does not have this failing of the prior art devices.

SUMMARY OF THE INVENTION

The method and apparatus of the invention include a hand graspable, pocket sized housing or carrier having a keyboard and a display, and a microprocessor for interfacing with the keyboard and controlling the display, the microprocessor being contained within the housing. The user of the device may enter a date and time to be stored and updated within the device. The program contained within the microprocessor generates a test comprising a series of random alphanumeric characters, and a cursor. The test taker must move the cursor to the blinking number (tracking) and then press the number button on the keyboard that matches the blinking number of the display (cognitive). During the test interval, the test taker must also respond to a secondary test that occurs at random times. (Distraction)

The program includes means for storing a personalized score related to a personalized code, so that each time a particular test taker utilizes the device, his personalized test score is updated and is compared with the most recent test score. In addition, the last date and last time of taking of the test for the particular user may be displayed. Also, provision is made for testing the user without comparing the test result to an earlier score, and without using the personalized code. Finally, provision is made for entering the personalizing score, for future comparisons for the particular user.

Scores are generated for the user depending upon the number of cursor movements required for the user to match the characters displayed, and also based upon the number of errors generated by the user and the measurement of response time. A caution display is energized, when the user falls within a given range of percentage errors. The caution display is blinked when the user falls outside of the desired percentage range.

DESCRIPTION OF THE PREFERRED EMBODIMENTS

Figure 1:
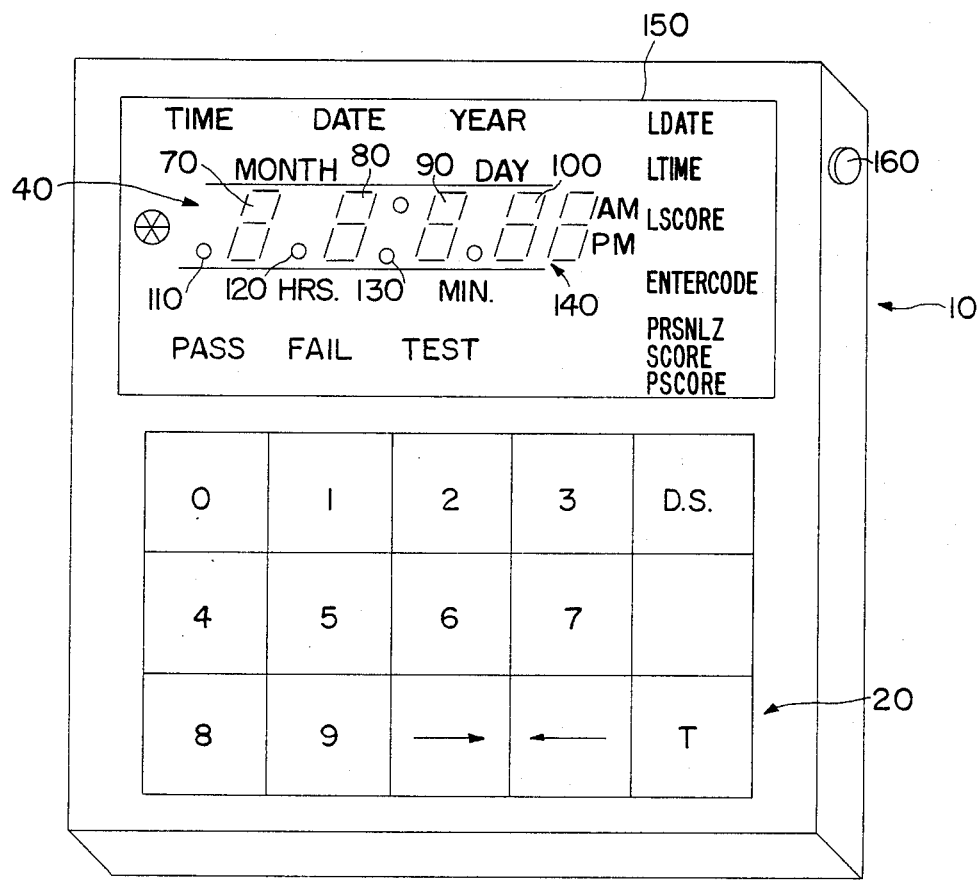
FIG. 1 is a perspective view of a test device incorporating the present invention.

The device of the invention includes a housing 10, as depicted in FIG. 1, which has a keyboard 20 coupled to an internally-carried microprocessor 30, which is preferably a 8749 microprocessor manufactured by INTEL. An LCD display 40 or other display is also provided, which is coupled to the keyboard 20 and the microprocessor 30 via an LCD driver 50, which is also carried internally of the housing 10. As shown in FIG. 1, the housing 10 also includes a variety of other displays (indicated by the words appearing on the face of the housing 10) with functions to be explained below.

A program is provided in the microprocessor 30 for implementing the functions of the present invention. A copy of a printout of the program is submitted herewith as Appendix A. FIGS. 4 through 12 are detailed flow diagrams of the coded printout. The code appearing in Appendix A is protected under United States copyright law, as indicated by the copyright notice thereon, and should not be reproduced without this copyright notice.

The housing 10 is preferably adapted for use as a hand-held unit, and includes an internal battery 60 for providing power and independence of external energy sources. A major function of the invention, as described herein, is to test a person's coordination and responsiveness, by measuring the person's normal coordination and responsiveness, and storing this result in a memory utilizing a personalized code. At a later time, a person's state of physical well-being is tested utilizing the invention, and a score is generated by the microprocessor 30 which is compared with the earlier test by utilizing a personalized code.

The display 40 preferably includes four digits for displaying alphanumeric characters, designated as digits 70, 80, 90 and 100. In addition, four cursor positions are provided, designated as cursor positions 110, 120, 130 and 140. The keyboard 20 preferably includes 10 numeric buttons (0-9) although letter buttons may also be provided, and further may include specialized command keys such as two arrow keys and control buttons (such as T, "reset" and "display select" or "D.S.").

Figure 2:
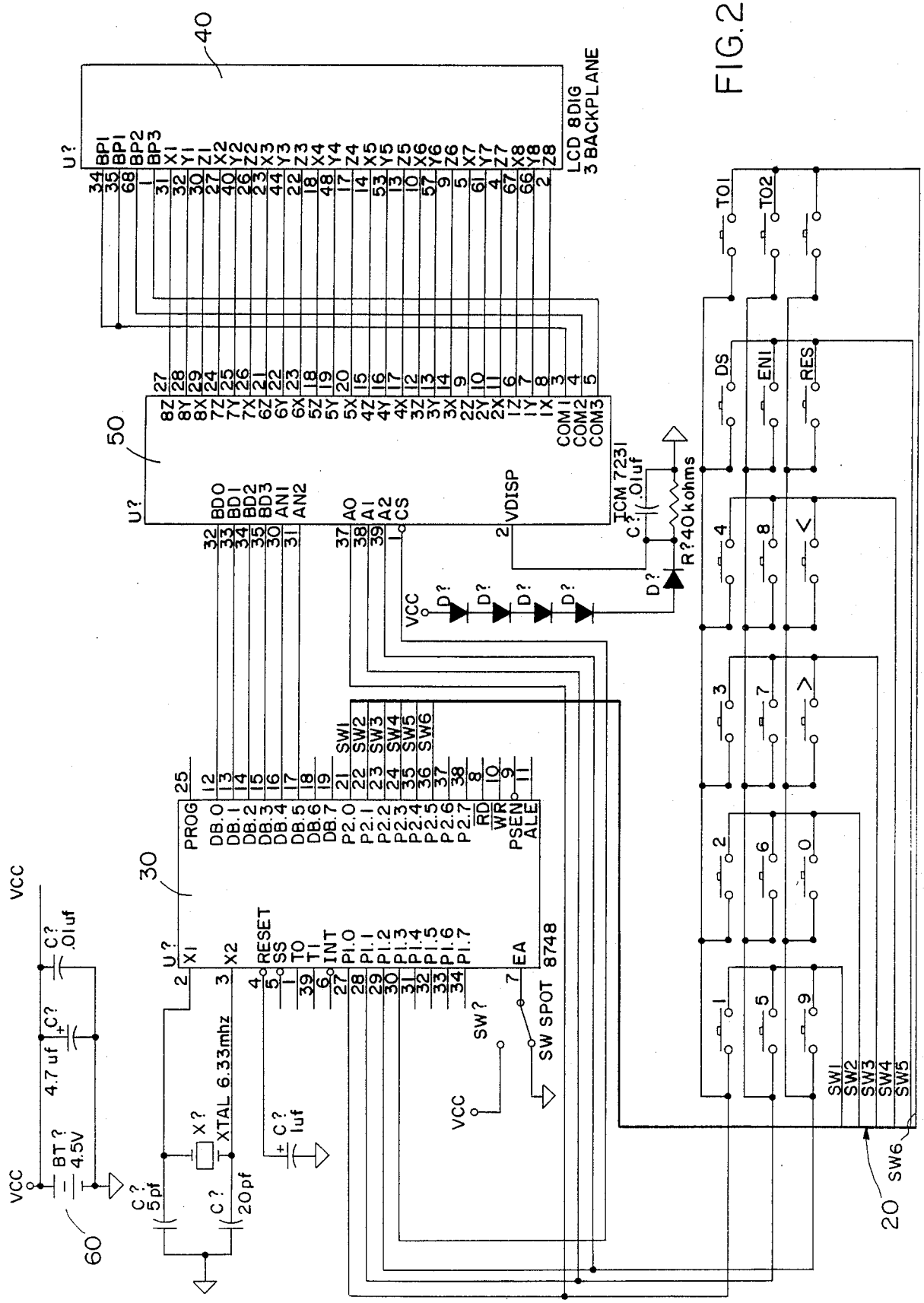
FIG. 2 is a schematic diagram showing circuitry of the invention.
Figure 3:
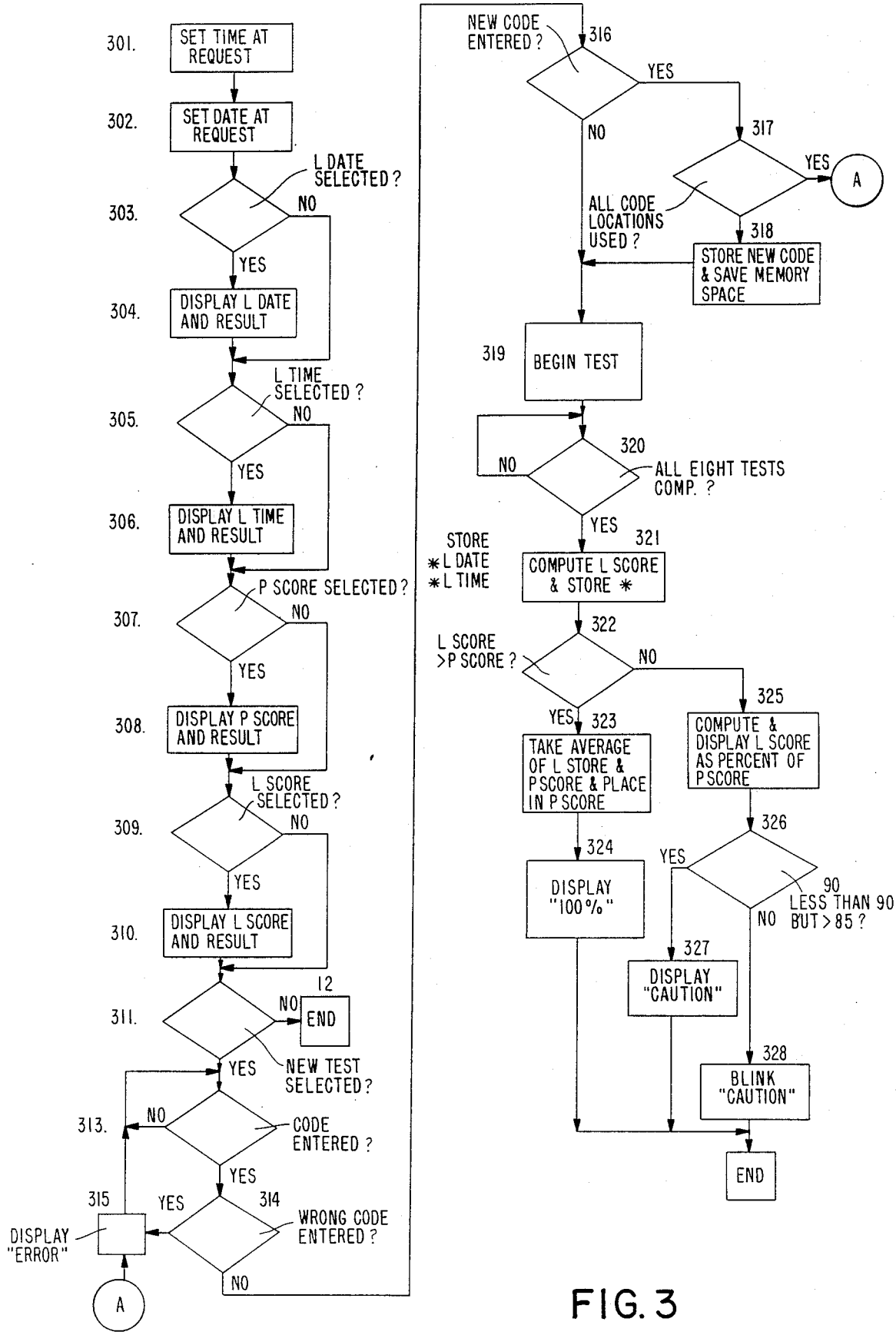
FIGS. 3–12 are flow charts of the preferred methods for carrying out testing according to the present invention.

FIG. 3 is a simplified flow chart depicting implementation of the invention by an apparatus of FIGS. 1 and 2. Initially, the user of the device presses the D.S. button until the "time" legend (301) is energized on the face 150 of the housing 10 (at the upper left thereof). In order to change the time, the user presses a "change" button, shown as button 160 in FIG. 1. Then the display select button is pressed to select the hours, as designated by "HRS." beneath digits 70 and 80. The "HRS." legend is energized, and the user presses the right and left arrow keys on the keyboard 20 in order to increment or decrement the hours displayed. Pressing and releasing a given arrow key once increments or decrements the displayed number by one, and holding a given arrow key down causes the changes to be implemented at a faster rate. Then, the change button is pressed again, and the minutes (i.e., "MIN.") display is energized, and the user selects the minutes just as the hours were selected. Finally, the change button is pressed once more, and the "AM" or "PM" display is selected, again by using the arrow keys. After one more press of the change button, the time display will be constantly on at the time selected by the user. In the preferred embodiment, a "time changed" indicator display remains on for 48 hours after the time or date has been changed.

The date may be set at the request of the user in a similar manner (302). Thus, the display select button is pressed until the "date" legend at the top of the face 150 is energized. The four-digit display now represents the month (in digits 70 and 80) and the day (in digits 90 and 100). A "month" legend is displayed over the digits 70 and 80, and a "day" legend is displayed over the digits 90 and 100. The date is changed by pressing the "change" button 160, and then by pressing the "display select" button on the keyboard 20 to select the month or day. Upon selecting a month change, the month is incremented or decremented utilizing the arrow keys, as with setting the time, while the digits for the month are flashing. Then the user presses the change button 160 again, and the day digits 90 and 100 flash, and the day is incremented or decremented utilizing the arrow keys. Upon another press of the change button 160, the date will be displayed and updated automatically, and the "time changed" indicator will remain on for 48 hours after the changes are implemented.

The program is also configured to display the last date (designated "LDATE") that a test was conducted. Thus, the user presses the display select button, until the LDATE legend is energized by the program (303). The user then enters in a personal code of 4 digits. When this is accomplished the display indicates the date the last test of this user was taken. By pressing the arrow keys, the display can be changed to LTIME, indicating the time the last test was taken and another press of the arrow key indicates the LSCORE or last score reached by the user. These displays cannot be changed except by taking a new test.

A test is taken by the user as follows. The display select button is pressed until the "test" legend is energized by the program (311).

The program then causes the "ENTER CODE" legend to flash, prompting the user to enter a four-digit personalized code utilizing the keyboard 20. If a non-personalized test is desired, the user enters in an all 0 code (4 codes). At this point, the "test" legend is lit.

In order to implement the test, beginning at box 319 of FIG. 3, all four digits 70-100 are displayed at the same time, and one of the digits will be flashing Also, one of the cursor positions 110-140 will be lit. The user presses the right and left arrow buttons until the cursor is lit adjacent to the flashing digit (70, 80, 90 or 100), and then presses one of the ten numeric keys on the keyboard 20 which matches the flashing digit. If the matched is correct, the digit stops flashing and is energized constantly. The user continues to move the cursor by utilizing the arrow keys to the other digits, which are caused by the program to flash in a random sequence, and continues to match these other digits by pressing the appropriate keys on the numeric key pad. During the test period, at random times, a flashing 5th digit (random in number) appears to the right of the screen. This is a distraction to the main test. The user is required to press the T button and then one of the digit buttons that matches the flashing distraction number. The time for the users response to the distraction is measured. The user can elect to complete the main test movement at the expense of the distraction test or to complete the distraction test function at the expense of the main test. The best score is arrived at as a compromise of both tests. If the user's responsiveness is slowed up, the user is apt to become more disoriented during the distract period and cause the overall score to decrease. The program is designed to give the user a predetermined maximum amount of time for matching all four digits.

Once the time has run out or the user has matched all four digits, four new random digits are displayed, and the test is repeated. This entire test is repeated eight times for a total of eight tests (320).

The program is designed to determine: the number of incorrect matches; the time for performing each test; the optimum number of cursor moves and the difference between the actual cursor moves and the optimum number of cursors moves; the response time to the distract test. The two time measurements are weighted and combined with the number of correct matches, incorrect keystrokes and excess cursor moves, in a manner to be described below, to compute a score.

This computed score is designated Lscore (Last score). If this is the first time the user has used the circuit, the Lscore becomes the users Pscore (Personalized score). The Pscore as well as the Lscore are stored within the microprocessor 30.

As soon as the test is over the unit displays (via digits 70–100) the percentage of this last score (Lscore) to the users personalized score (Pscore) (325). If Lscore is equal to or greater than Pscore (322), 100% is displayed (324). If Lscore is less than Pscore, the percentage difference is displayed (325). A caution is blinked for percentages less than 85% (328).

After the percentage is computed and displayed, the microprocessor 30 determines if a new Pscore is to replace the old Pscore. This will only occur if Lscore is greater than the old Pscore. If it is, then the new Pscore becomes the average of the old Pscore and Lscore (323). The new Pscore is stored under the user's code in the microprocessor 30.

The new Pscore may be viewed by pressing the display select button until the "PSCORE" legend is activated, at which point the user's personal code is also entered (308). The personalized score will then be displayed at the digits 70–100.

The last test taken by a user is stored under the user's code as "LSCORE" (310) and the present date and time are scored as, respectively, "LDATE" (304) and "LTIME" (306).

If the user enters the code of all zeros (four zeros), the user will not have an earlier personalized score, so that criteria must be chosen for determining whether a pass or fail is to be generated. Provisions may be made in the program for comparing the LSCORE test result generated at box 321 of FIG. 3 with a standard test result, and/or factors such as age, weight, sex etc., may be taken into account, in effect generating a look-up table with a particular score to be matched depending upon the data entered for the individual characteristics of the user.

In the preferred embodiment, the scores are generated as follows (321). A test evaluation routine is provided by the program, which takes the reaction time of the user and the number of correct responses by the user, and the number of incorrect button strokes along with the difference of cursor strokes versus the computed number of optimum cursor strokes and creates a score from these values. Reaction time is determined by measuring the time interval from the start of a test to when all four digits are successfully tracked and matched. The reaction time of each of the eight tests are averaged and the result stored. The reaction time is first divided by 16, and the result is subtracted from 128. The value thus generated is then added to the contents of the "hit register", i.e., the register containing the number of correct responses by the user, generating what shall be referred to as the original score. The program also generates a number representing the minimum number of cursor moves which would be required for a completely correct response, and stores this in a register referred to as a cursor hit register. Each cursor stroke made by the individual being tested is subtracted from the contents of the cursor hit register, and in addition the total number of incorrect keystrokes entered by the user is subtracted from the cursor hit register. If the user completes the test perfectly, a zero is returned as the value for the cursor hit register, meaning that no wrong keys were pressed and there were no extra cursor strokes. If the result for the cursor hit register is positive, this indicates that the user did not finish the test (since completion of the test would require entering exactly the number of keystrokes originally stored in the cursor hit register).

Usually, a negative number will be generated for the cursor hit register, since the user will generally require at least one keystroke more than the minimum number required. Thus, if a positive number is generated, this is dealt with by inverting it, i.e., making it negative.

The first 12 or fewer errors are subtracted directly from the original score. If there are more than 12 errors, the extra errors are doubled and then subtracted from the original score, as adjusted by the first 12 errors. The score is never allowed to go negative, but stops at zero if there are sufficient errors.

The four best "distraction" reaction times are stored and an average taken. This average is added to the base score.

By way of example, for a perfect score, the hit register would be 32 and the reaction time $(128 - 352/16)$ equals 106, for a perfect score of 138 $(= 106 + 32)$. Hit register number is determined as follows. In each subtest, the subject is asked to match four numbers. There are eight subtests for a total of 32 $(= 8 \times 4)$ possible "hits."

The reaction time is determined as a 16 bit binary number that is incremented every 20 msec. In a typical calculation a score of 352 means that it took the user 7040 msec. $(= 352 \times 20)$ to match all four numbers (an average of 1.76 sec per matched digit). The score of 352 is divided by 16 which is 22. Since we are looking for a positive number which will be to the faster player's advantage, we subtract this score from an arbitrary number, in this case 128. Therefore $128 - 22 = 106$; $106 + 32 = 138$.

In a second typical reaction time calculation, if the user took 1.9 sec per digit or $1.9 \times 4 = 7600$ msec, this would result in a binary number of 380. This is then divided by 16 for a number of 24. When one subtracts 24 from 128 this gives 104. If the user didn't match all the numbers but only 30 out of 32, his total score would be 134. If the cursor hit register contained a count of 14 (to indicate 14 more cursor moves than necessary), then a hit register correction value of 16 determined as the sum of $12 + 2 \times 2$ would be subtracted from the score, in accordance with the above-described method. In this case, the score result would be $138 - 24 = 114$.

Finally, the distraction reaction time best score would be a 31. Assume that the four best reaction time scores were 25, 24, 24 & 20 or an average of 23 (a score of 25 infers that the reaction times for that distraction test was 0.6 sec or $(31 - 25) \times 0.1$ sec.). This would be added to the score. $(114 + 23 = 137)$ Scores up to 167 have been reached and higher scores are possible.

The score result is then placed in the LSCORE register. Then, LSCORE is multiplied by 100, the result is divided by PSCORE, and displayed as a percentage (325).

If the percentage of LSCORE is within 90% of PSCORE, this is considered acceptable. If the percentage is between 85–90%, a caution symbol may be energized (327). If the percentage is less than 85% the caution symbol may be blinked (328), i.e., repeatedly energized and de-energized.

A later PSCORE is compared with an earlier PSCORE by taking the difference between the new score and the old score.

If the new PSCORE is greater than the old PSCORE, the difference is multiplied by 0.5 and added to the old PSCORE (323). If the new PSCORE is less than the old PSCORE, the old PSCORE remains unchanged.

One of the four personal codes is hardwired in as four (4) zeros (0000). This it could be used by anyone. It is intended for those users who have not personalized their score (or established a baseline). The PSCORE for this code is set to a universal number. (In one version this number is set to 125.) The user then tests himself to this universal personalized score. It will be appreciated that this baseline mode is not as sophisticated as the personalized mode.

Referring now to FIGS. 4 through 12, the program contained within the microprocessor 30 uses an EXECUTIVE routine (400) (shown in FIG. 4) to cause all the elements of the program to function in a proper and timely manner.

It begins by outputting data to the LCD display (401). The program then determines if a key on the keyboard (20) is being activated (402). The keyboard data is read in and if it is new data (as distinct from a finger still pressing a key that has been read in) it passes the new data along to the subroutine in the mode that is presently active. (Test mode (405), Personalize mode (407), P score mode (409) or L score mode (411)). The EXECUTIVE routine is set up to handle additional modes that one may wish to add at a later time, such as TIME MODE, TIME UPDATE MODE, PRINT MODE, etc.

Figure 4:
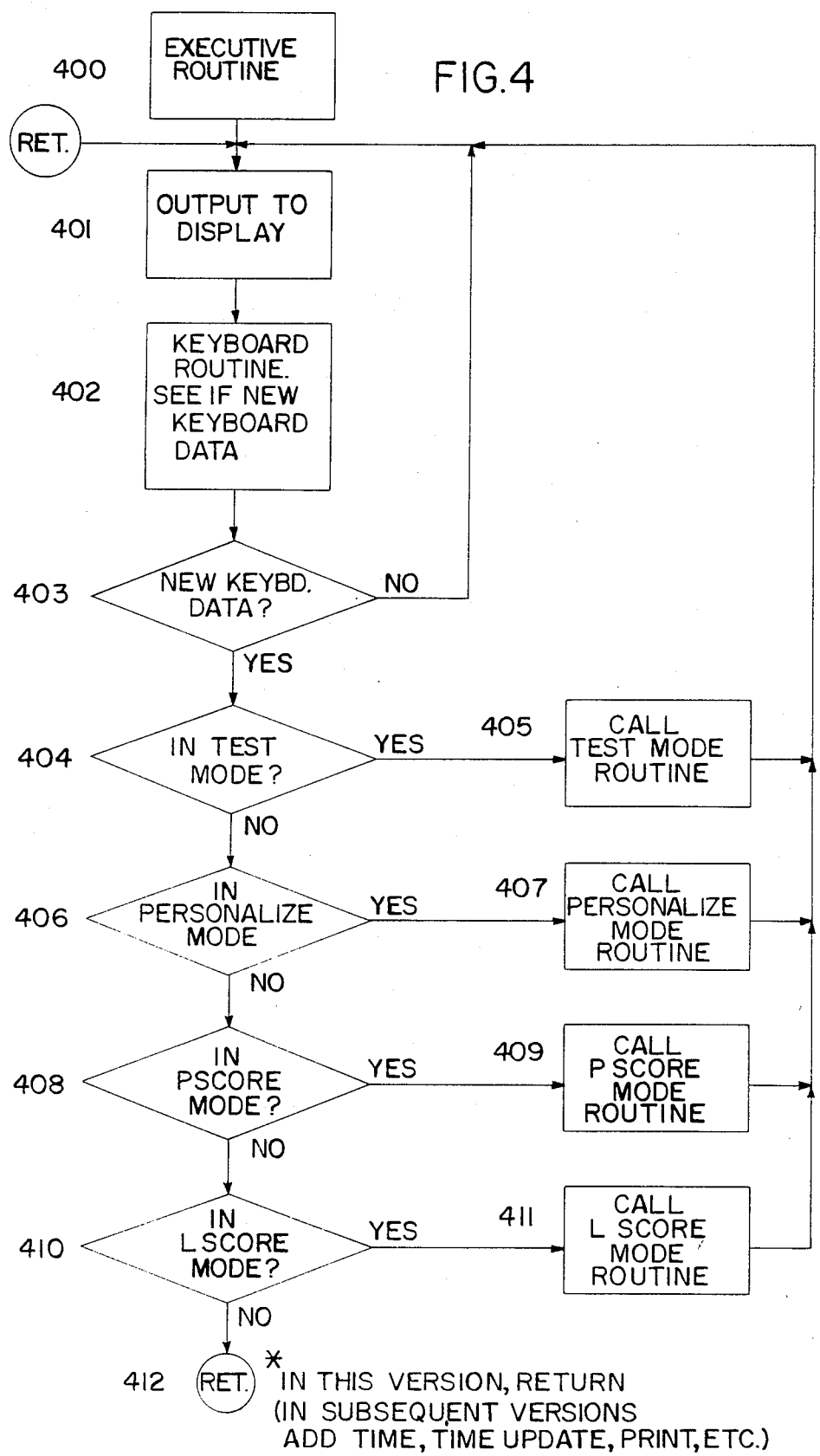

In the course of the discussion relating to FIGS. 4–12, it will be understood that the mode in which the microprocessor is, at any given time, determines which of the routines is branched to in FIG. 4, as indicated by the numerals 405, 407, 409 and 411. In addition, throughout FIGS. 4–12, any reference to a "return" (indicated by RET in a circle and the numeral 412) means that the program returns to the junction between box 400 and box 401, as shown in FIG. 4.

The Executive Routine of FIG. 4 is the master routine, and the program always has access to this routine. The Executive Routine calls each of the other routines as necessary during execution. Each of these other routines is discussed below.

Figure 5:
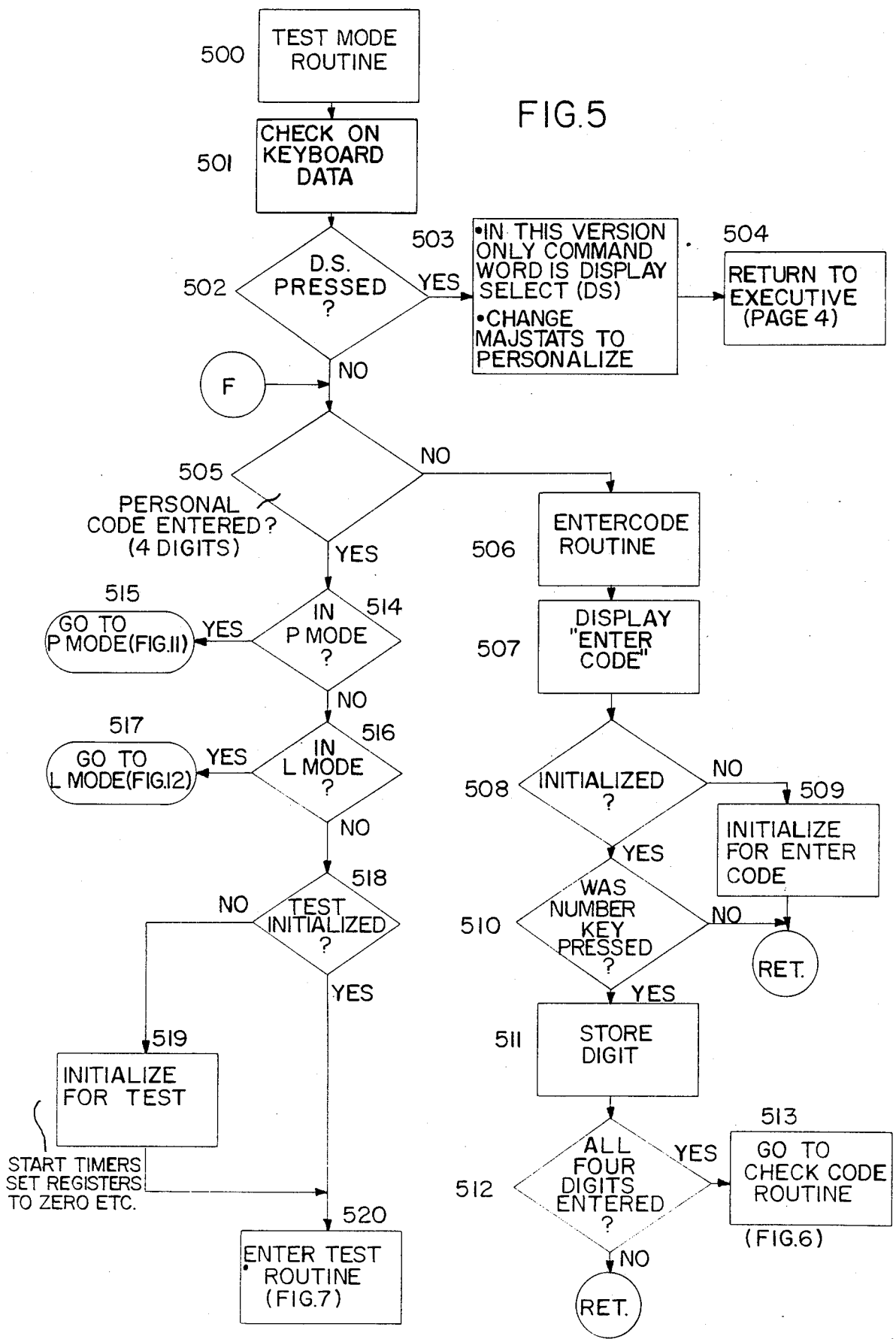

TEST MODE Routine 500: FIG. 5

The new keyboard data is checked (501) to see if the D.S. button was pressed (502). If it was, the mode is changed to PERSONALIZE (503), and control is passed back to the EXECUTIVE routine (504) (FIG. 4).

If the D.S. button was not pressed, the program checks to see if the personal code was entered (505). If the personal code was not completely entered, the program is steered to the "ENTERCODE" routine (506). This path (506-513) is repeated until all four personal code digits are entered.

Figure 6:
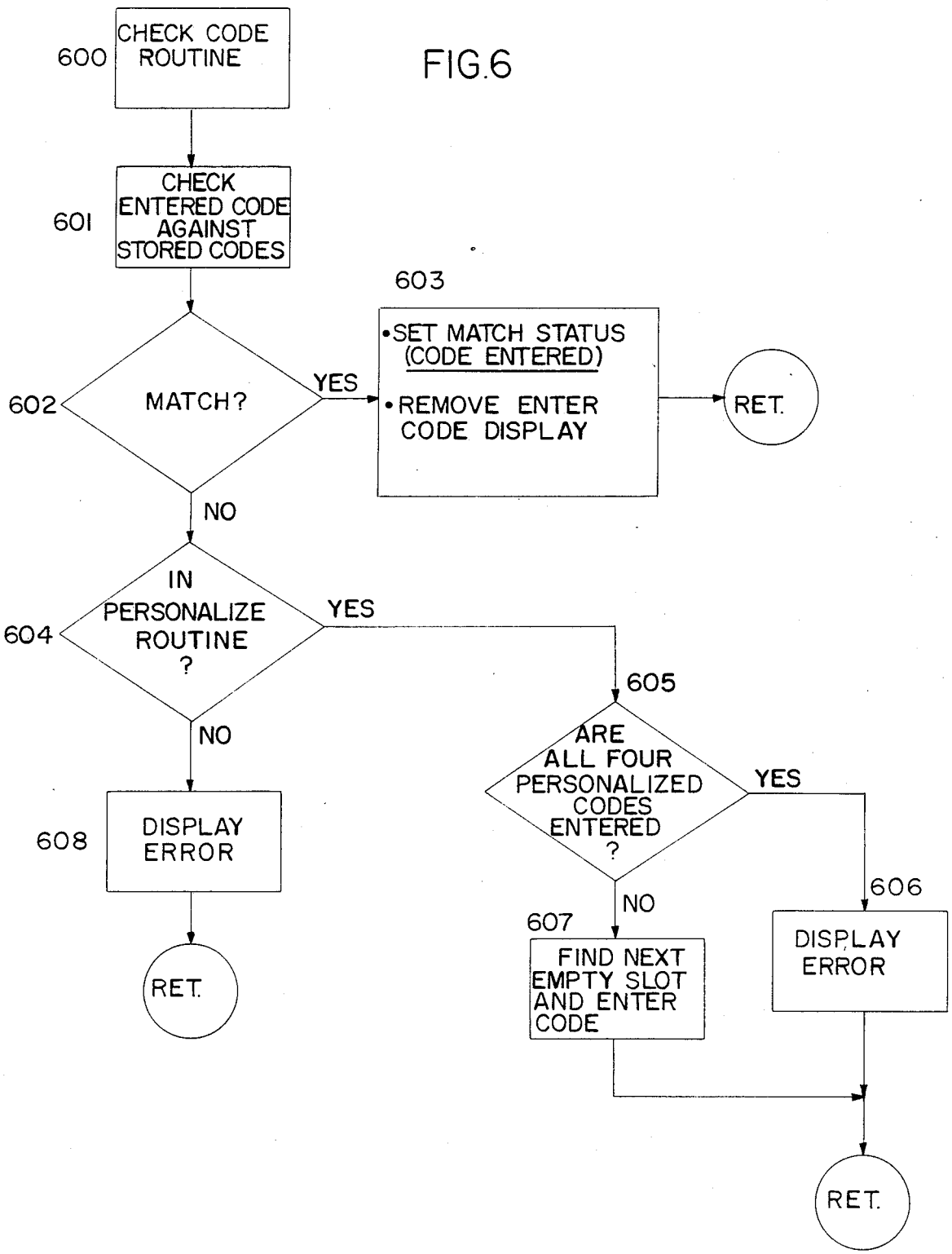

When all four digits are entered, the program is switched to the CHECK CODE routine (513) which determines if the code is new or is an existing code (FIG. 6).

If the personalized code was entered then the program is steered to P MODE (514), or L MODE (516), or TEST (518). A status register within the program keeps track of the MODE, or SUBMODE, that is currently taking place.

CHECK CODE Routine 600: FIG. 6

The program is steered to this routine when the user has entered all four digits of a personal code. This routine checks if the code matches a previously stored code or if the code entered is a new code.

For a previously stored code (603), the status register is updated, indicating that the code is correct, and the "Enter Code" symbol on the LCD display is removed.

If the four-digit code does not match a previously stored code (602) and the present mode is not PERSONALIZE (604), then an "error" symbol (608) is displayed on the LCD display. If the present mode is PERSONALIZE, then a check is made to see if all four available code slots are taken (605). If code slots are available, then the code is entered (607). The unit takes three code slots, (three independent users with their own personalized codes) and a universal code slot of all four zeros (0000).

If no code slot is available, the unit displays the ERROR message on the LCD display (606).

TEST ROUTINE (700): FIG. 7

This routine is entered when in the TEST or PERSONALIZED mode and the user has entered a correct personalized code. The program will remain in this mode until the test is complete or until the D.S. button is pressed.

This subroutine first checks a backup timer to see if the timer timed out (701) (user took too long). If the timer timed out (path C), the flow diagram indicates that the reaction timer is stopped and that the Reaction Time Average is updated (724). If the timer did not time out, the keyboard data is checked (702) to see if the T button was pressed (703). If it was, and the Distraction Test is on (704), then the T flag is set (705) and the program returns to the EXECUTIVE routine. If the Distraction Test was not on (704), then the CRSRHREG is decremented (706), penalizing the user for pushing the wrong button.

If the T button was not pressed (703), a check is made to see if a number button was pressed (707). If this test (707) was negative, then a check is made to see if a cursor button was pressed (708). If this test proves negative, the program returns to the EXECUTIVE routine. If this test (708) proves positive (meaning that the cursor button was pressed), then the CRSRHREG is decremented (709) and a check is made to determine which cursor button was pressed, left or right (710), and the cursor is moved accordingly (711 or 712).

If a number button was pressed (707), a check is made to see if the T flag was set (713). The program must determine if the user is responding to the mainline test or to the Distraction test. If the T flag was set, the user is responding to the Distraction Test, and a check is made to see if the number button pressed matches the displayed Distraction Test number (714). If it does not, the program returns to the EXECUTIVE routine and no penalty (except a delay in reaction time) is exacted. If the numbers match (715), then the Reaction Timer is stopped, and the Reaction Time is checked to see if it is one of the four best times, and if it is, it is stored. The Distract Test flag is removed (716), the T flag is removed (717), and a counter is started to generate the next random Distract Test Start Time (718).

If the T flag was not set (713), the user is responding to the main line test. A check is made to see if the cursor positions match (719). If they do not, the CRSRHREG is decremented (721), causing a penalty. If they do, a test is made to determine if the numbers match (720), by determining whether the button currently being pressed matches the number of the blinking light. If they do not match, the CRSRHREG is decremented (721) and the user is therefore penalized. If they do match (722), then the HITREG is incremented and the Blink is removed (so that the number stops blinking).

The program then checks to see if the game is over (723). If it is, the Reaction Timer is stopped and the reaction time average is updated with the latest Reaction Time (724). The program then proceeds as shown on FIG. 8 (path B). If the game is not over, then the next digit is caused to blink (725).

Figure 7:
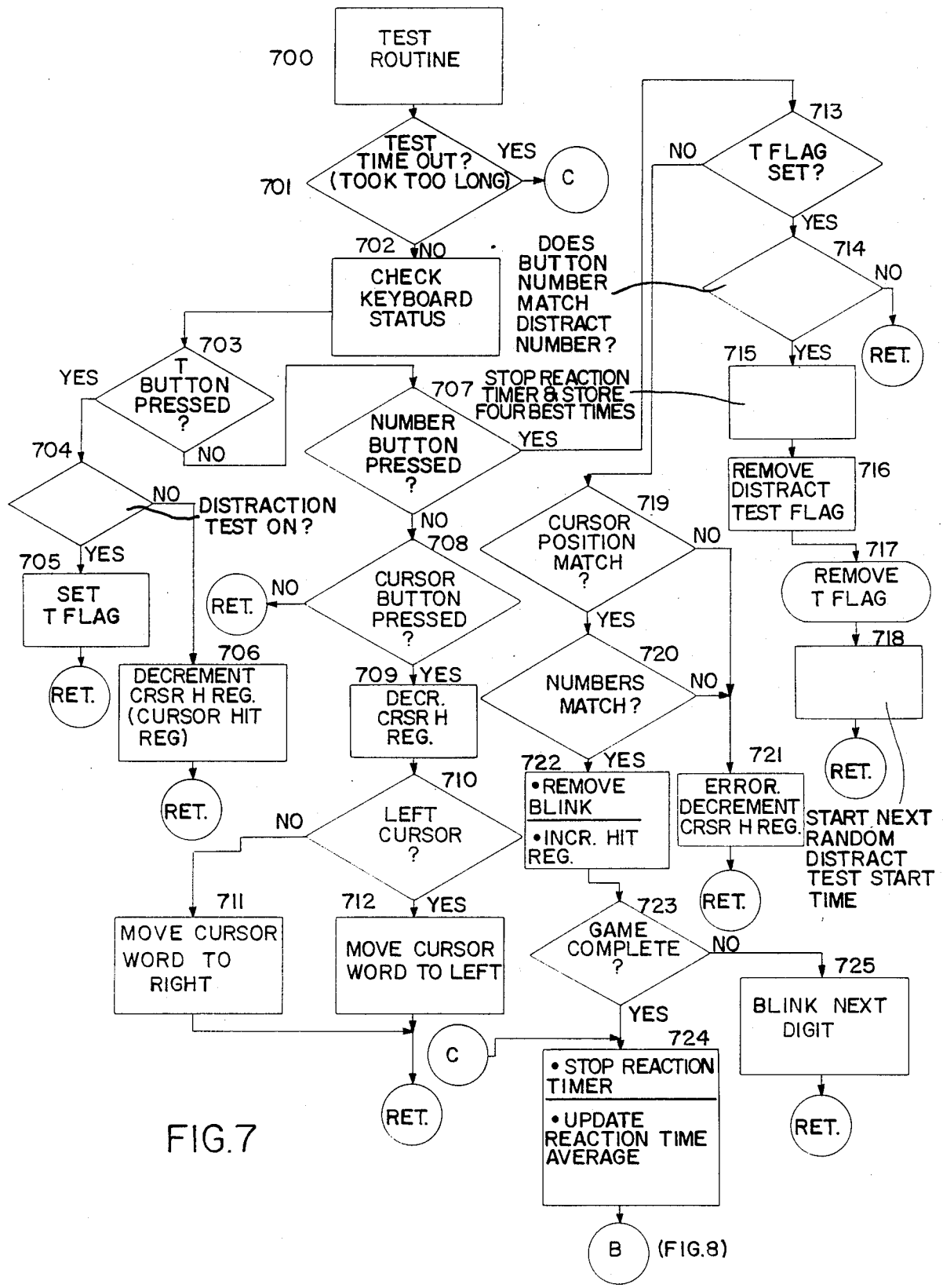
Figure 8:
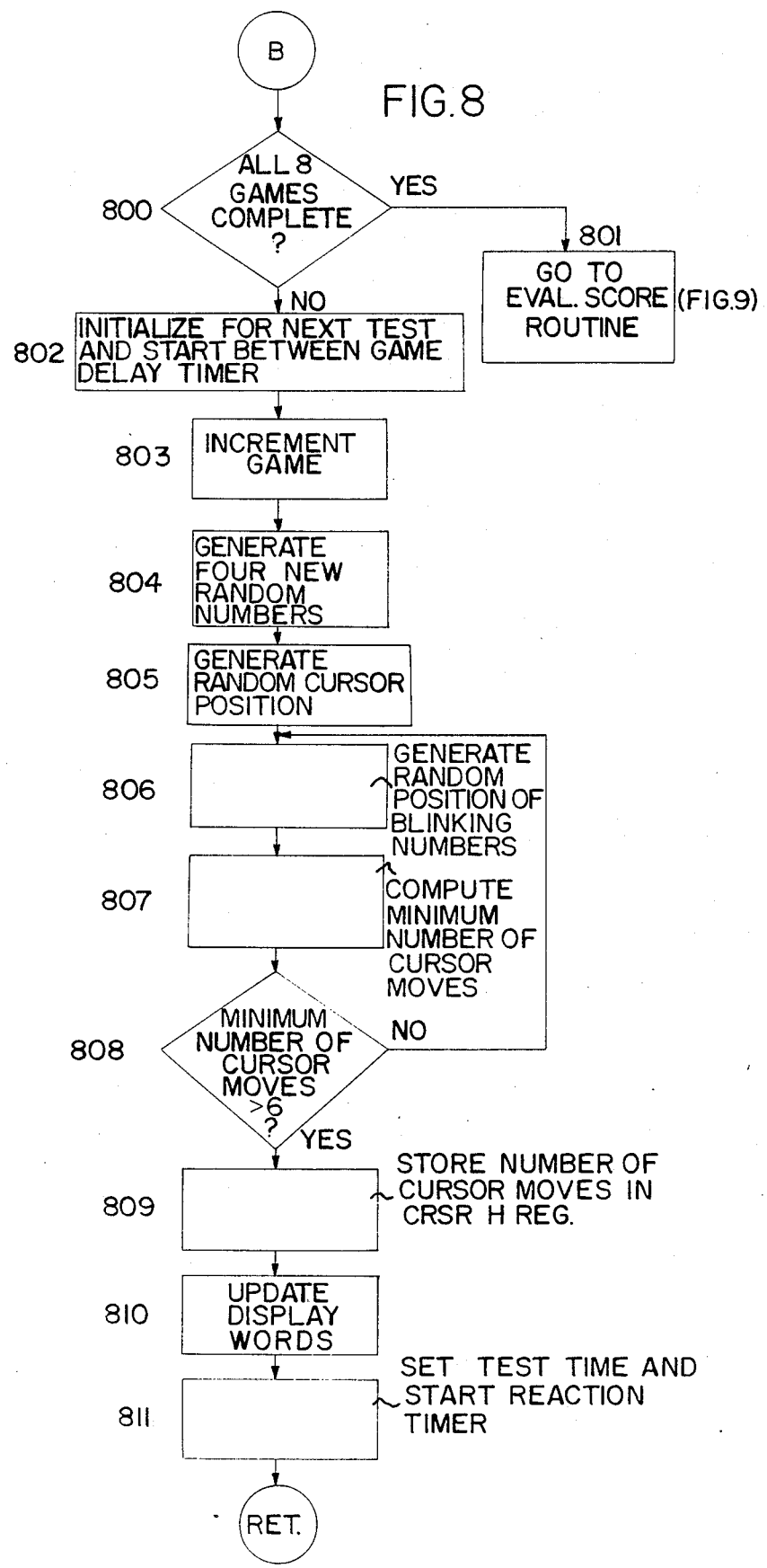
Figure 9:
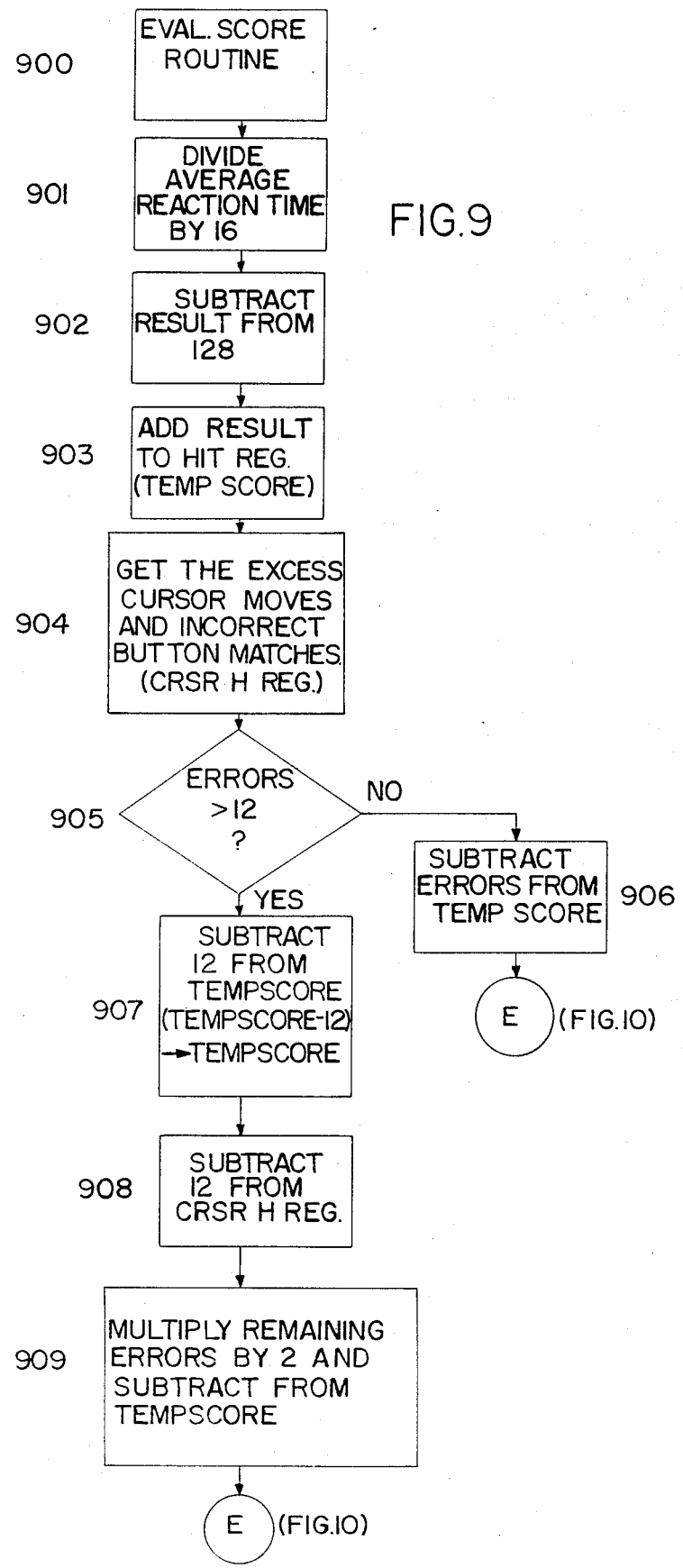

FIG. 8 is a continuation of the flow chart of FIG. 7. The program checks to see if all eight games are complete (800). If they are, the program is directed to the EVALUATE SCORE routine (801). If the games are not over, the program then causes the following actions to occur:

802—Initialize for the next test and start the Between Game timer;
803—Increment the Game (from 1 to 8);
804—Generate four new random numbers;
805—Generate random cursor position;
806—Generate random position of blinking number;
807—Using random cursor positions and random blinking numbers, compute the minimum number of cursor moves;
808—A check is made to determine if the minimum number of cursor moves is equal to or less than six. If it is, go back to 806 and try again; if the minimum number of cursor moves is greater than 6, go on to 809;
809—Store the number of expected cursor moves in CRSRHREG;
810—Update the display words;
811—Start test time and start Reaction Timer. At this point, the program is returned to the EXECUTIVE routine.

EVALUATE SCORE ROUTINE 900: FIG. 9

This routine is entered after each Test Routine. The purpose of this routine is to combine the Test's reaction times, correctly matched buttons and incorrectly struck buttons, and develop a score. This score is then tested against past scores and displayed as a percentage of the stored better scores. If the latest score exceeds previous best scores, then the latest score updates the previous best score (PSCORE). The test score generated is also stored and displayed as the last test score (LSCORE).

The user's average reaction time is divided by 16 (901) and the result subtracted from 128 (902). A register titled HITREG contains all the correct button matches (up to 32) for all eight tests. The contents of this register is added to 902 and temporarily stored (903).

The contents of register CRSRHREG is examined (904). This register starts with the optimum number of cursor moves and is decremented every time a cursor button is pressed or when the T button is incorrectly pressed. At the end of a test, this register contains the number of excess cursor moves. The program checks if the excess cursor moves exceeds 12 (905). If there were fewer than 12 excess cursor moves, the number of excess cursor moves is subtracted from TEMPSCORE (906) and passes to the continuation of the flow diagram in FIG. 10 via path E. If the number of excess cursor moves (called errors) exceeds 12 (907), the number 12 is subtracted from the TEMPSCORE, and the number of excess cursor moves that exceed 12 are multiplied by 2 (909) and subtracted from TEMPSCORE, resulting in a greater penalty. The program continues on FIG. 10 via path E.

Figure 10:
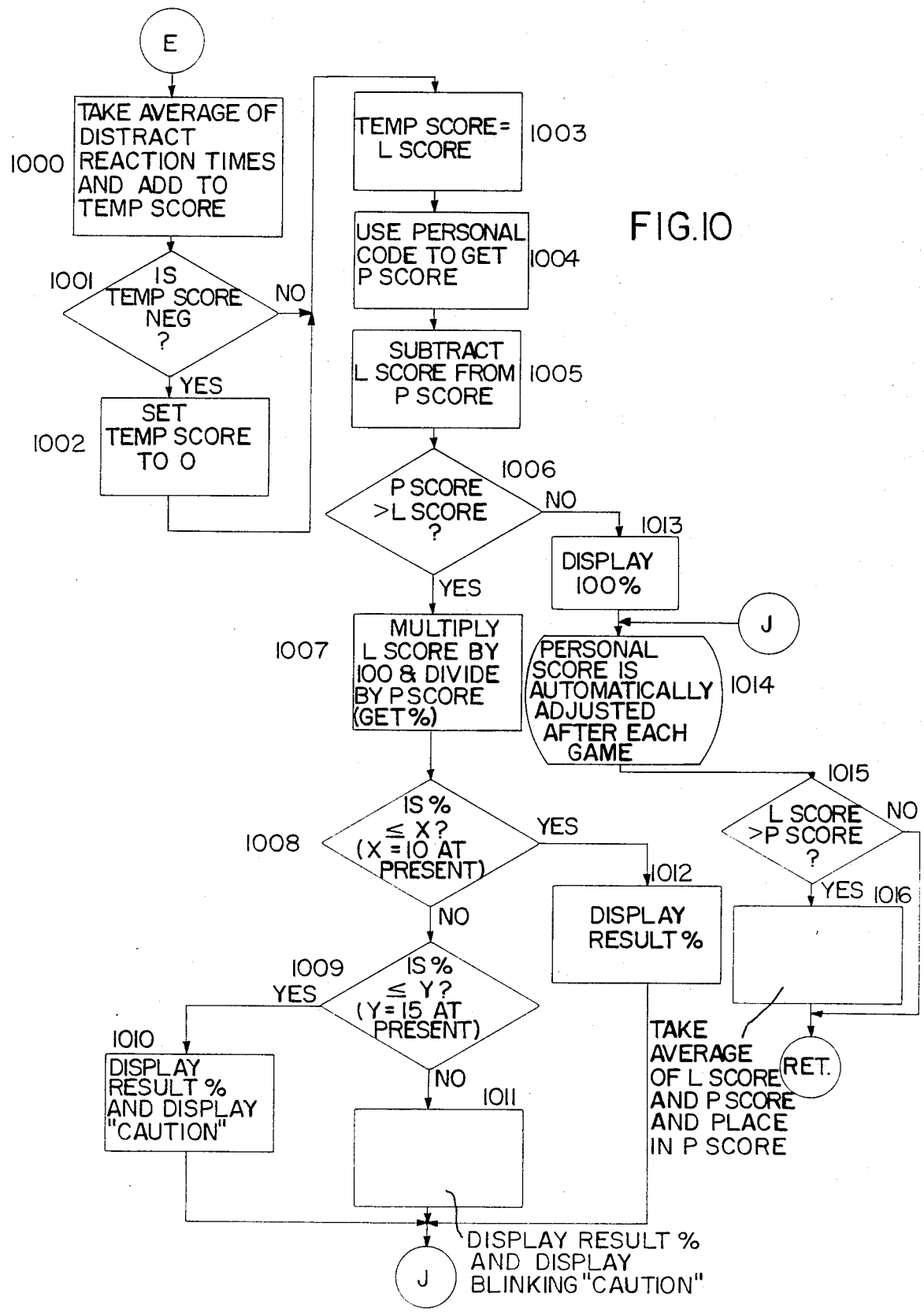
Figure 11:
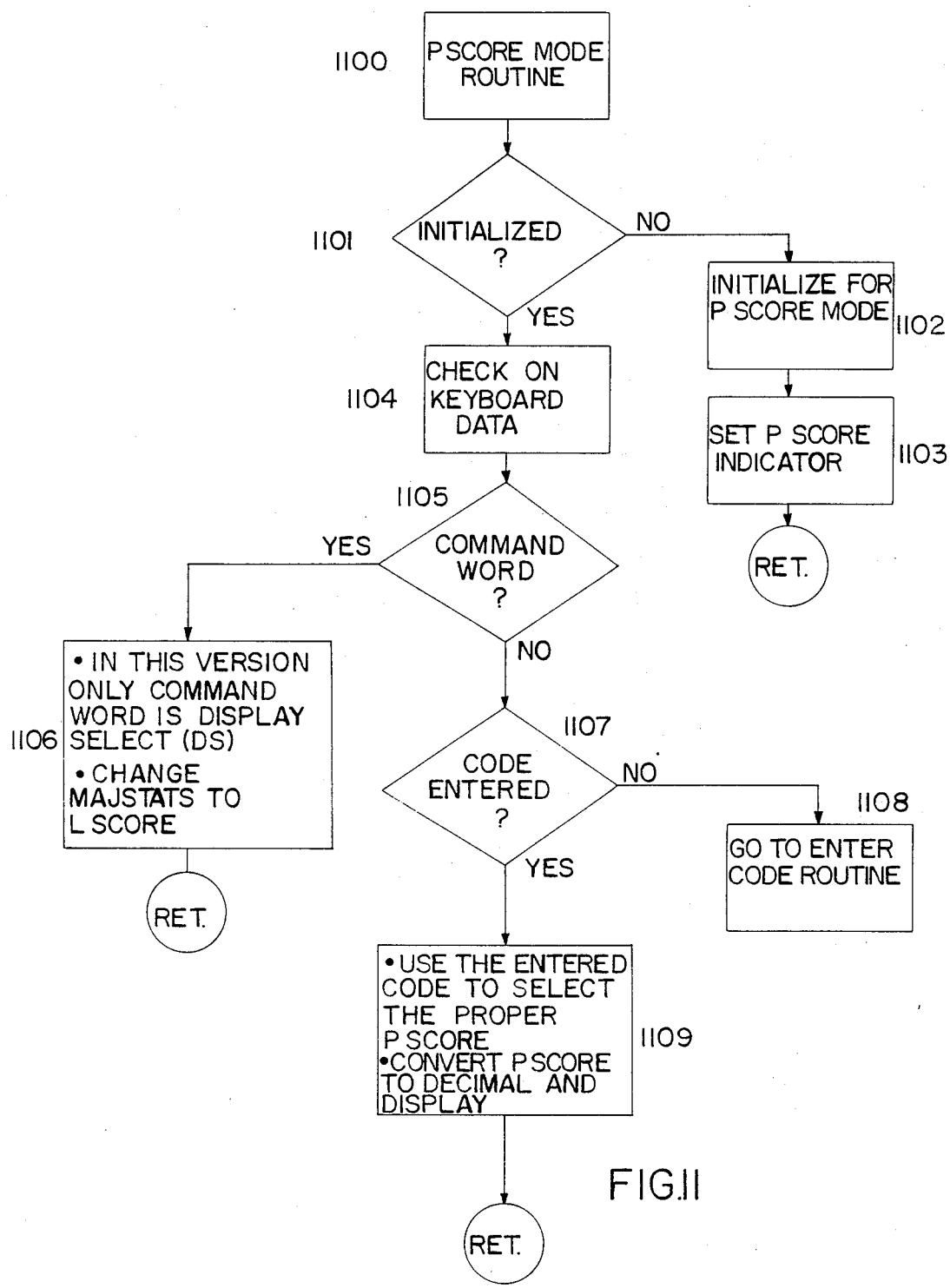
Figure 12:
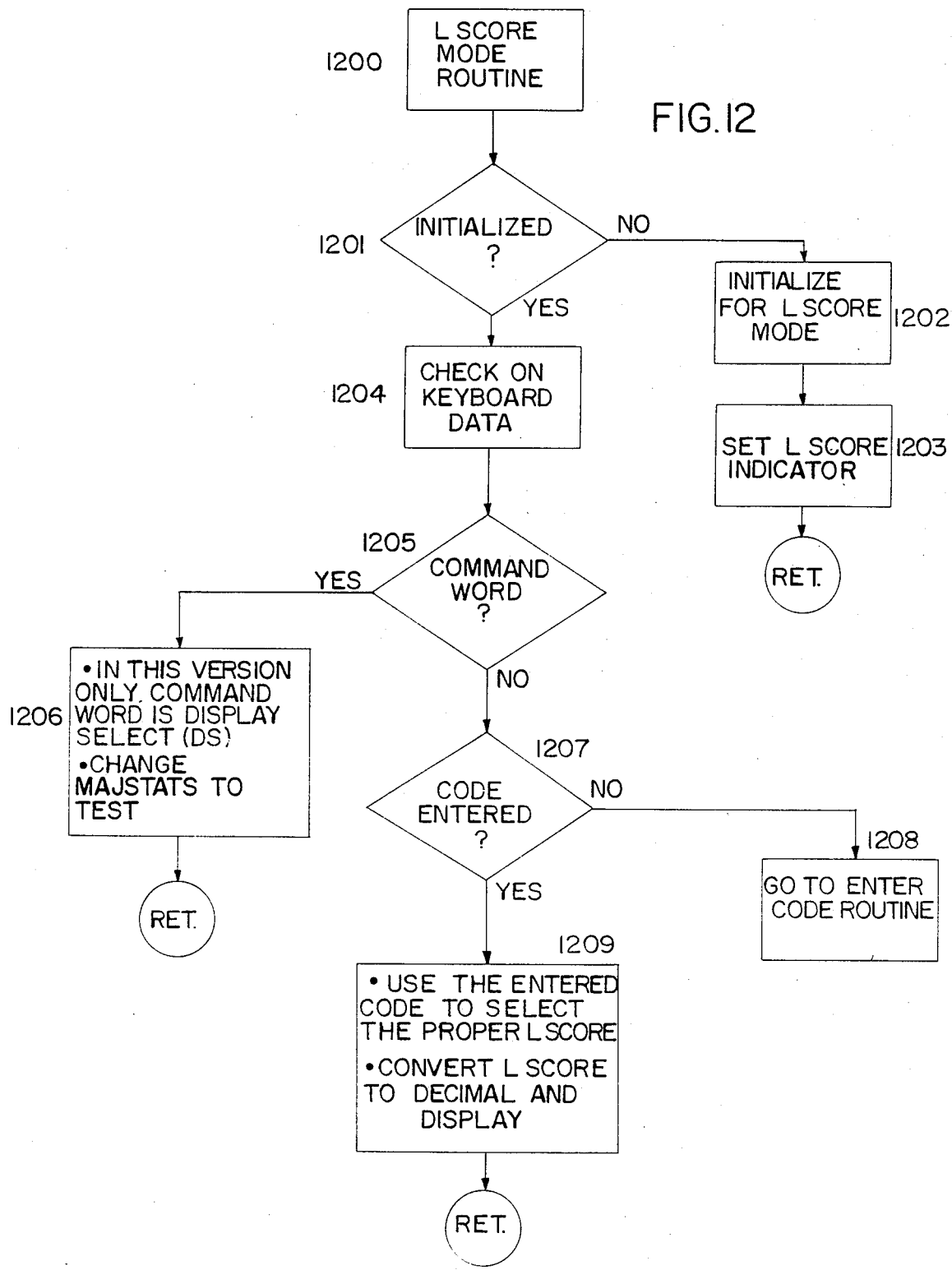

EVALSCORE ROUTINE (continued) 1000: FIG. 10

The TEMPSCORE result, so far, is then added to the average of the four best Distraction Test Reaction times (1000). The program tests if the new TEMPSCORE is negative (1001). If it is, then TEMPSCORE is set to zero (1002). The new TEMPSCORE (or zero, if it was negative) is now placed in the LSCORE register for this user (1003). In the preferred embodiment, there are four LSCORE registers.

The user's personal code is used to get the user's PSCORE (1004). (There are four PSCORE registers.) The user's LSCORE is subtracted from the user's PSCORE (1005). If the result is negative (LSCORE>PSCORE) (1006), the program causes 100% to be displayed (1013). If the result is positive (PSCORE>LSCORE), the program causes the percent of LSCORE to PSCORE to be computed (1007) If the percent is greater than 90% (1008), then the percent of LSCORE to PSCORE is displayed (1012). If the percent of LSCORE to PSCORE is less than 90% but greater than 85% (1009), then the percent is displayed along with a "CAUTION" indicator (1010). If the computed percent is less than 85%, then the percent is displayed along with a blinking "CAUTION" indicator (1011). The threshold levels that affect the "CAUTION" sign and the blinking "CAUTION" sign may be adjusted to other values as desired.

At this point (J in flow chart), the program adjusts the user's personal score (1014) (PSCORE). If the LSCORE was greater than the PSCORE (1015) (user's personal best), the average of the LSCORE and PSCORE is computed and placed in the user's PSCORE (1016). The program now returns to the EXECUTIVE routine.

PSCORE MODE 1100: FIG. 11

This mode is arrived at when the user activates the D.S. button while in the TEST MODE. In this mode, the user enters his/her personal code and the user's PSCORE is displayed (which is a score derived from the user's best scores).

In the PSCORE mode, the program checks to see if all the registers involved in this mode have been initialized (1101). If not, the registers are initialized (1102) and the PSCORE legend on the display is energized (1103).

If the PSCORE mode was initialized, a check is made on the new keyboard data to see if a command was issued (1105). If so, the program causes the mode to change from PSCORE to LSCORE and control reverts back to the EXECUTIVE routine (1106). If the keyboard data was not a command word, the program checks to see if the personal code was entered (1107). If not (1108), the program is steered to the Enter Code Routine (506).

If the code was entered, the user's PSCORE is displayed on the LCD display (1109).

LSCORE MODE 1200: FIG. 12

This mode is arrived at when the user activates the D.S. button while in the PSCORE MODE. In this mode, the user enters his/her personal code and the user's LSCORE is displayed (the user's last test score).

In the LSCORE mode, the program checks to see if all the registers involved in this mode have been initialized (1201). If not, the registers are initialized (1202) and the LSCORE legend on the display is energized (1203).

If the LSCORE mode was initialized, a check is made on the new keyboard data to see if a command was issued (1205). If so, the program causes the mode to change from LSCORE to TEST, and control reverts back to the EXECUTIVE routine (1206). If the keyboard data was not a command word, the program checks to see if the personal code was entered (1207). If not (1208), the program is steered to the Enter Code Routine (506).

If the code was entered, the user's LSCORE is displayed on the LCD display (1209).

The above invention has many applications, such as testing individuals' reaction to external stimuli such as drugs, or medicine, alcohol, sleepiness, etc. Also, the progressive affects of disease on the individual over periods of time may be tested, and other psychological or physiological testing may be implemented.

A very important application for the above invention is an interlock system for cars, trucks, or other machinery, to prevent a user from operating the machinery unless a "pass" indication is obtained. Naturally, this can also be used as a field test for suspected intoxicated drivers or the like. Another application for the invention is for use as a skill game.

Because of the personalization aspect of the invention, this device has great value in accuracy of results which prior art devices do not supply, since they utilize standardized results which might not properly apply to a given individual. Variations on the invention as described above may be had without departing from the spirit and scope of this invention.

Appendix A
Copyright 1988 by Savalife

```
:20000900054991142FB823F05209D2160421B825F0D3C3C61F0421945CF4F0B2C2F22B522D23
:200002900040944lB445CB820B923F153FEA1BA03273797F7AC398AFF0A37A0C64AF14301D7
:20004900A118FCEA3CF1125427A1B5529FB929F1325D0468C923FD51A1B923230841A1BDDA
:20006900058A03892427ABAEAC978820F0671EE67FABFEA11CFBED76188D05EA75FC03FF68
:20008900969FB923F1F2AB4380A1BB3723F0504303A0BB0214A0B3B828FB40A018FB3750D3
:1900A900A08372AEB3529FB824F003F1E3B825A05370AAF1538F4AA18389
:0E03F20091929394C195969798C29990A1A06C
:2000C200D2D54340A0BA0834A0BB30231050432AA034F5D42DD2F1B2DD9400B93AF1B2E4BC
:1100E200040919F137C6EB040927A114F90409C43E1D
:20040000122F2301A1B94A27A119A1F90307A9237DA1BA0434A0B92E230F514310A1B93BB0
:20042000027A1C9B85CBA0427A01BEA2794A6F13236B4FDF0D263B83AF0524ED48EB93AF13B
:200440005244C4C1BA0434A0B92E23EF51A1B926F19267B267B83AF04320A0B3B923F143AA
:200460004A18353BFA083BB3AF072D39280231040A0B9352350A1BB0414A0BA0434A08349
:2004800B929F1528683C923FB51A1F45DB83A230840A0B93BF112BD2301A1B93C27A1B918
:2004A0005594C394AC83B831230FA08394A68856B95AF0A118C9F0A1BB0814A08397A7F702
:0B04C00094C3B3A1D4F7BE50D4E7839F
:0600F300B955F107A183DD
:2004CB0023DF51A1945CA49DB929F1B2CBB923F1B2E2D2E692E48384FDA418945CB825F090
:2004EB00D3C296F3F4F012F614F383B83A238040A0B3945C14F3F410B925F11210B93DF192
:20050B00E7E7F40483893DF17777F40483945C883AF0F245B93DB83E230351AA230350AB00
:20052B00DAC63114F383B92AF96BA9230F51AAB925230F51DAC69B14F383B831F0530FAA30
:20054B008825230F50DAC65C83F1AAAB3797A77083B85CB95BB454E67518B454E67A18B42D
:20056B0054E67F18B454E684A486F0AAF1A01BF0ABFAA01BF0AAFBA01BFAA0B83A237F50A8
:20058B00A0F4F053FEA094AC94A683A4DAB93C11EF96B93BF132B5B93BBB3FF1A01B19F16E
:2005AB00A0A4CEB93A232041A183B83FB93BF09771AA1B19230F50AB230F517B9767A0FA05
:2005CB0067C8A0B93BF1F2AEB93A23C751A183B93EB4ED53BFA1B93EF17777A1B4ED4340B4
:2005EB00A183F15303B92A69A9F183A0B925F1530F83B83BF0B20DB923F19211D20FB20F14
:20060B00C44BC446C45A945CF05264327C12B584F6B92AA1D4262301A0C44BB92F230F4167
:20062B00A183B93AB824F0D305C63BF18327A02340A1B32380F4F4945C0409B929F1525235
:20064B00B83B234040A0B3B93A230241A1C44BB923230441A1945CC44B232FB4F6B92DA166
:20066B00B928230441A11923FBA1B9352380A1C44B2307B4F6B92CA1C44B2303B4F6B92B4F
:20068B00A1C44BB92AF141794147AA19F147194147AB8944BC04FAD196BAFB19D196BBF995
:2006AB00030789A1A1B93A230441A11927A1831919ECA183C4D2F4F0B2BFB92F2307A1B991
:2006CB003A23C051A10409B944BC03F13796E1FAA1FB19A1B43B1919ECD6C4C5B93627A155
:2006EB00B937F1530F4EA1B82014A08327B93BA119A1B928231041A183A15303B82A68A8D6
:11070B00231040A083B92ABA04236F51A119EA148388
:2000F900BBF754FF94A6346FB941F117A9FBA134CFB941F1A917A8F0AA3797A771C61AF612
:200119002EBA0834A0B92B2301A11927A119A1B930231FA183B964F41C292A8B41F0A8F06E
:200139002A34AA13FBE64234C18A0834A0BB2CFC47530FA01BFC530FA0B830231FA097A796
:20015900236F7CE65F83B82F237A97A77CE66B231FA0239FA083B840F0530F47C820475347
:200179000F40A0BAB0F03797A77AABB93CF1F2BB248C2753FE6BABB85CBA03F018977067CB
:07019900EA956BAB54DA8319
```

```
:13071C00BB08279767296729E6276AEB1F97672967298366E
:2001A000B92A230FA119EAA483832A372A2B27ACAD372B97A7AF7A297B29E6A934C1248385
:2001C000831C2CAEC7530FD7FE572C2D572DB3B941F1A9F137AC96DCFBA124F4FB3797A7F3
:2001E00071ADF6F4FC97A77B97676AC24F097676C61A124F483B83A27A018A08327A9F0BA0F
:200200000A34AAFF530FB92DA1C9230F5CA1C9FC47530FC617A183230FA1B3D22E4340A02E
:20022000BA0B34A0B8302310540430DA034F5D420D25282369400B93AF1B23D040919F1C653
:20024000430A092737A1B841F0A8BA0434A034FC04092304F4F4945C04094491D26C434040
:20026000A0BA0834A0B8302307A034F5D420D25AB2749400B93AF1B27B040919F1C6810413
:20028000092737A1B841F0A81BBA0434A034FC04092320F4F4945C0409BA08B92ABB00B89E
:2002A00029F0F2A7F144ACF1D2B8F2B602FB3B9B908191BEAA18344BC430F44AA53CF44AC2D
:2002C000F0530F07A8F053F04BA0FB83F053F0470747ABF0530F4BA0FB83B955F1F2E03748
:1F02E00037537FAE9713F3E6F297F754F6230C54F683FE54F68397A7377BF6FD27AB83FC
:02000700640A89
:2002FF00B82BFB50A01BFB3740A083D5AE238062B85610F096248595239CA01810F0D309AA
:20031F0096242303A0B92BF11259F1326CF15278F192B5F1B28DF1729FBB5454CCFB96516F
:20033F004390A0A5B58929F1F24E4380A16451537FA1B928F1D2CEFE2593B833F007A096F2
:20035F00291BF0C8A09629BBFE54FF6429B83754C0962CBBFD54FF642C8B35F007A0962FE4
:20037F00BBFB54FF642FB8B3810F0963218108B36F007A096351B54CC9635B8DF54FF643509
:20039F00B6A364CC85B859F007A096CCBBF754FFBB4014A0F4F04301A0C7533FD7B85AF078
:2003BF0057530FB8314340A0B858B233FA0643B76D26456A5B85BF007A0C60C6456BBBF542D
:03030F00FF645662
:02000000E42FEB
:20074F0010B944A119EA52276255C52504098943F197F26727A7E4692737AAC9D15304F7CA
:20076F00ABF1F753F64BA119FAD15368E7AAF1F7532F4AA1C9BB02B82AC7530FD7F157AAC3
:20078F00530FA0FA47530F18A01819EB88B93EF177777747A15303AD77EDA727A8BC04B9BE
:2007AF003EF1AB530337AAB93DF1E4C6FB530337AAFB7777AB530397A77AC6CF12CE1B180F
:2007CF00ECBB23F997A778F6DAE49C8955F861A1BB3D74E24310A1BB3E74E24340A1BF04C7
:0907EF00B3BB26F0B3B826A0B32C
:0903E200B92A23035069A9F18333
:00000001FF
```

What is claimed is:

1. A device for determining an individual user's acuity at a given time, comprising:
   first generating means for generating a first pattern;
   means connected to the generating means for displaying the pattern in an alphanumeric form visually readable by the individual user for testing the individual user's physical acuity;
   second generating means for manually generating a second alphanumeric pattern by the individual user;
   first determining means connected to the first and second generating means for determining an elapsed length of time between the display of the first alphanumeric pattern and the generating of the second alphanumeric pattern by the individual user;
   second determining means for determining a minimum number of actions necessary to generate the second alphanumeric pattern by said second generating means;
   third determining means for determining a matching result of the second alphanumeric pattern with the first alphanumeric pattern;
   means connected to said second generating means for counting a number of actions actually taken by the individual user in generating the second alphanumeric pattern; and
   means connected to said first determining means and a predetermined standard length of time for generating a first comparison of the elapsed time, means connected to said second determining means and said counting means for generating a second comparison between said minimum number of actions and said number of actions actually taken, and means based upon said first and second comparisons and the matching result from said third determining means for outputting a signal to said displaying means for indicating the individual user's physical acuity.

2. The device of claim 1, wherein the outputting signal is a pass signal or a fail signal.

3. The device of claim 1, wherein the predetermined standard length of time is based upon the individual user s previous test.

4. The device of claim 3, wherein the predetermined standard period of time is updated after each test.

5. The device of claim 1, wherein the alphanumeric pattern displaying means comprises a plurality of displays, one of said plurality of displays provides a highlighted alphanumeric character, and the second generating means is a plurality of positions, each corresponding to one of the displays, and the second alphanumeric pattern is generated by selecting the position corresponding to the highlighted display and inputting an alphanumeric character corresponding to the character shown on the highlighted display.

6. The device of claim 1, additionally comprising means for generating and recording the date and time of the test administered and means for recording the test score achieved.

7. The device of claim 1, wherein the first generating means further includes means for generating a third pattern at a random time during the displaying of the first pattern, and means for determining a time for the individual user to match the third pattern by means of the second generating means.

* * * * *

UNITED STATES PATENT AND TRADEMARK OFFICE
CERTIFICATE OF CORRECTION

PATENT NO. : 4,978,303
DATED : December 18, 1990
INVENTOR(S) : Al Lampell

It is certified that error appears in the above-identified patent and that said Letters Patent is hereby corrected as shown below:

ON THE TITLE PAGE: Item [19] correct the spelling of the inventor's name to read --Lampell--

ON THE TITLE PAGE: Item [75] correct the inventor's name to read --Al Lampell--.

Signed and Sealed this

Twenty-fourth Day of November, 1992

Attest:

DOUGLAS B. COMER

*Attesting Officer*    *Acting Commissioner of Patents and Trademarks*